United States Patent
Wills

(10) Patent No.: US 7,188,512 B1
(45) Date of Patent: Mar. 13, 2007

(54) APPARATUS, SYSTEM, AND METHOD FOR CALIBRATING A PARTICULATE PRODUCTION ESTIMATE

(76) Inventor: J. Steve Wills, 2128 California St., Columbus, IN (US) 47201

( * ) Notice: Subject to any disclaimer, the term of this patent is extended or adjusted under 35 U.S.C. 154(b) by 0 days.

(21) Appl. No.: 11/301,737

(22) Filed: Dec. 13, 2005

(51) Int. Cl.
*G01M 15/00* (2006.01)

(52) U.S. Cl. ..................... 73/23.31; 73/118.1
(58) Field of Classification Search .............. 73/23.31, 73/23.32, 112, 116, 117.2, 117.3, 118.1; 701/29, 701/99, 101
See application file for complete search history.

(56) References Cited

U.S. PATENT DOCUMENTS

| | | | |
|---|---|---|---|
| 6,405,528 B1 | 6/2002 | Christen et al. | 60/295 |
| 6,435,019 B1* | 8/2002 | Vojtisek-Lom | 73/118.1 |
| 6,622,480 B2 | 9/2003 | Tashiro et al. | 60/295 |
| 6,672,050 B2* | 1/2004 | Murata et al. | 60/284 |
| 6,756,904 B2 | 6/2004 | Kinugawa et al. | 340/606 |
| 6,758,039 B2 | 7/2004 | Kuboshima et al. | 60/311 |
| 6,829,889 B2 | 12/2004 | Saito et al. | 60/291 |
| 6,829,890 B2 | 12/2004 | Gui et al. | 60/295 |
| 6,854,265 B2 | 2/2005 | Saito et al. | 60/295 |
| 6,907,873 B2 | 6/2005 | Hamahata | 123/676 |
| 6,941,750 B2* | 9/2005 | Boretto et al. | 60/297 |
| 7,031,827 B2* | 4/2006 | Trudell et al. | 701/114 |
| 7,065,960 B2* | 6/2006 | Gioannini et al. | 60/295 |
| 2002/0196153 A1 | 12/2002 | Kinugawa et al. | 340/606 |
| 2003/0066286 A1* | 4/2003 | Murata et al. | 60/284 |
| 2003/0167757 A1 | 9/2003 | Boretto et al. | 60/295 |
| 2004/0172933 A1 | 9/2004 | Saito et al. | 60/277 |
| 2004/0204818 A1 | 10/2004 | Trudell et al. | 701/114 |
| 2004/0226352 A1* | 11/2004 | Craig et al. | 73/118.1 |
| 2005/0137776 A1* | 6/2005 | Gioannini et al. | 701/101 |

* cited by examiner

*Primary Examiner*—Eric S. McCall

(57) ABSTRACT

An apparatus, system, and method are disclosed for calibrating an estimate of the status of a mechanism or process, for example, particulate production from a diesel engine. A first estimator makes a first particulate production rate estimate as a function of, for example, differential pressure over a particulate filter over time, a second estimator makes a second particulate production rate estimate by interpolating between high and low production rates, and a calibrator calibrates the second estimator according to the difference between the first and second estimates. The calibration may be carried out by calculating new high and/or low production rates, and may depend on the reliability of the first estimate.

27 Claims, 7 Drawing Sheets

APPARATUS, SYSTEM, AND METHOD FOR CALIBRATING A PARTICULATE PRODUCTION ESTIMATE

PRIORITY APPLICATIONS

This application is a continuation-in-part of co-pending application, Ser. No. 11/227,403, titled "Apparatus, System, and Method for Estimating Particulate Production," filed 15 Sep. 2005, incorporated herein by reference.

BACKGROUND OF THE INVENTION

1. Field of the Invention

This invention relates to feedback systems, and more particularly to apparatuses, systems and methods for estimating and calibrating particulate production from diesel engines.

2. Description of the Related Art

Environmental concerns have motivated the implementation of emission requirements for internal combustion engines throughout much of the world. Governmental agencies, such as the Environmental Protection Agency ("EPA") in the United States, carefully monitor the emission quality of engines and set acceptable emission standards, to which all engines must comply. Generally, emission requirements vary according to engine type. Emission tests for compression-ignition or diesel engines typically monitor the release of diesel particulate matter (PM), nitrogen oxides ($NO_x$), and unburned hydrocarbons (HC). A critical emission of gasoline or other stoichiometric engines is carbon monoxide (CO). Catalytic converters have been implemented in exhaust gas after-treatment systems for spark-ignition engines, eliminating many of the pollutants present in exhaust gas, though historically such aftertreatment systems have not been added to diesel engines. However, to remove diesel particulate matter, typically a diesel particulate filter, herein referred to as a filter, must be installed downstream from a catalytic converter or in conjunction with a catalytic converter.

A common filter comprises a porous ceramic matrix with parallel passageways through which exhaust gas passes. Particulate matter accumulates on the surface of the filter, creating a buildup that must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, which is refractory and not easily wiped away, can be oxidized and driven off of the filter in a process called regeneration. In most applications soot accumulates much faster than ash, to the extent that an estimate of the rate of soot accumulation is substantially equivalent to an estimate of the rate of total particulate accumulation.

Various conditions, including, but not limited to, engine operating conditions, mileage, driving style, terrain, etc., affect the rate at which the engine produces particulate matter, and the rate at which such matter accumulates within a diesel particulate filter.

For purposes of determining when to initiate regeneration of diesel particulate filters based on the amount of accumulated particulate matter on them, it is beneficial to know how much particulate the engine is producing. A method, apparatus and system for doing so are disclosed in this application's parent application. However, problems can arise when, after the determination has been made, one or more of those factors undergo unseen change: aging of the engine, EGR valve malfunction, turbo or fuel injector changes.

From the foregoing discussion, it should be apparent that a need exists for an apparatus, system, and method for estimating or predicting particulate output from a diesel engine. A further need exists for calibration of such an apparatus, system, and method.

SUMMARY OF THE INVENTION

The present invention has been developed in response to the present state of the art, and in particular, in response to the problems and needs in the art that have not yet been fully solved by currently available particulate estimation methods. Accordingly, the present invention has been developed to provide an apparatus, system, and method for calibrating particulate output estimates that overcome many or all shortcomings in the art.

In one aspect of the invention, an apparatus for calibrating estimated particulate production from a diesel engine includes a first estimator for estimating a first production rate and a second estimator for estimating a second production rate. The second estimator is configured to interpolate between a high rate and a low rate according to a rate marker. The apparatus contains a calibrator configured to calibrate the second estimator according to the difference between the first and second estimated rates. In one embodiment, the calibrator calculates new low and high production rates as a function of the rate marker.

In one embodiment, the apparatus contains a reliability determiner configured to determine the first estimate's reliability, enabling the calibrator to calibrate the second estimator according to the reliability of the first estimate. The first estimator may estimate the rate as a function of differential pressure over a diesel particulate filter over time. The apparatus may contain a recognition module that recognizes opportunities for calibration.

In a further aspect of the invention, a method of calibrating an estimator comprises making a first estimate of the status of a mechanism or process, using the estimator to determine a second estimate by interpolating between high and low status values according to a status marker, and calibrating the estimator according to the difference between the estimates, which calibration may include, in one embodiment, calculating new high and/or low status values.

In one embodiment, the method may comprise determining the reliability of the first estimate and calibrating the estimator according to that reliability. The calibration may also be carried out proportionate to the difference between the first and second estimates or as a function of the status marker. The status value may denote a diesel engine's particulate production rate, the first estimate being a function of differential pressure across a particulate filter over time.

In a further aspect of the invention, a diesel engine system comprises a diesel engine, an exhaust system containing a particulate filter, and a controller. The controller comprises a first estimation module configured to estimate a first engine particulate production rate, a second estimation module configured to estimate a second engine particulate production rate by interpolation, a comparison module for comparing the first and second estimates, and a calibration module for calibrating the second estimate according to the comparison. In one embodiment, the first estimate may be made as a function of differential pressure across the filter over time.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the drawings, in which.

DETAILED DESCRIPTION OF THE INVENTION

Figure 1:
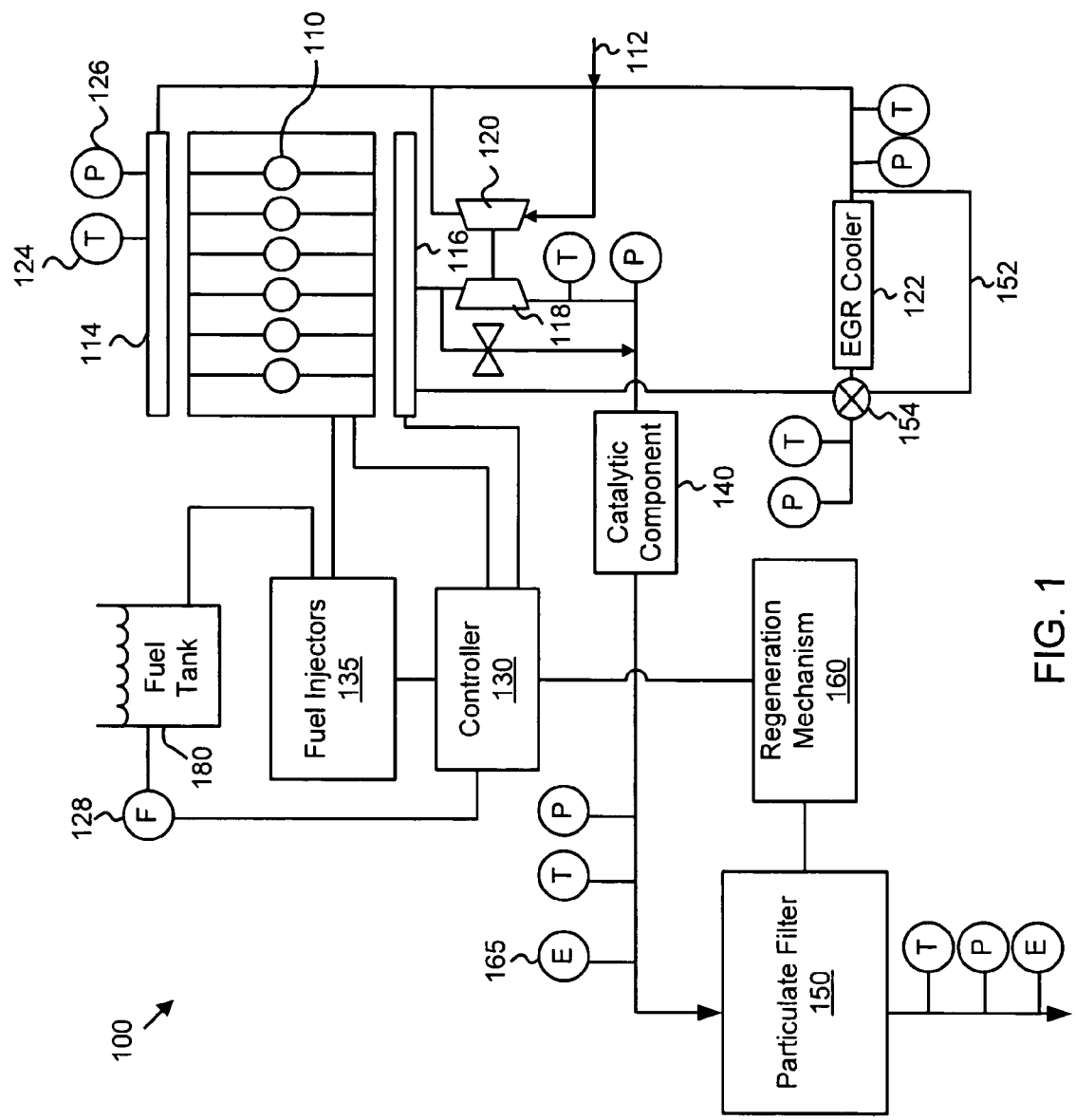
FIG. 1 is a schematic block diagram illustrating one embodiment of a diesel engine and exhaust system according to the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an internal combustion engine system, such as a diesel engine system 100, in accordance with the present invention. As illustrated, the engine system 100 may include a diesel engine 110, a controller 130, fuel injectors 135, catalytic component 140, particulate filter 150, and fuel tank 180.

The engine system 100 may further include an air inlet 112, intake manifold 114, exhaust manifold 116, turbocharger turbine 118, turbocharger compressor 120, exhaust gas recirculation (EGR) cooler 122, temperature sensors 124, pressure sensors 126, and fuel sensors 128. In one embodiment, the air inlet 112 is vented to the atmosphere, enabling air to enter the engine system 100. The air inlet 112 may be connected to an inlet of the intake manifold 114. The intake manifold 114 includes an outlet operatively coupled to the combustion chambers of the engine 110. Within the engine 110, compressed air from the atmosphere is combined with fuel to power the engine 110, which comprises operation of the engine 110. The fuel comes from the fuel tank 180 through a fuel delivery system including, in one embodiment, a fuel pump and common rail (not shown) to the fuel injectors 135, which inject fuel into the combustion chambers of the engine 110. The timing of the fuel injection is controlled by the controller 130. Combustion of the fuel produces exhaust gas that is operatively vented to the exhaust manifold 116. From the exhaust manifold 116, a portion of the exhaust gas may be used to power a turbocharger turbine 118. The turbine 118 may drive a turbocharger compressor 120, which compresses engine intake air before directing it to the intake manifold 114.

At least a portion of the exhaust gases output from the exhaust manifold 116 is directed to the particulate filter 150 for filtering of particulate matter before venting to the atmosphere. The exhaust gas may pass through one or more catalytic components 140 to further reduce the number of pollutants. A regeneration mechanism 160 regenerates the filter 150, timing and extent of regeneration being controlled by the controller 130.

Particulate matter produced by the engine 110 comprises ash and soot. Soot accumulates much faster than ash, such that, in one embodiment, an estimate of the rate of total particulate accumulation can be satisfactorily generated by estimating the rate of soot accumulation, treating the ash accumulation rate as negligible.

Some amount of the exhaust gas may be re-circulated to the engine 110, according to a proportion set by the controller 130. In certain embodiments, the EGR cooler 122, which is operatively connected to the inlet of the intake manifold 114, cools exhaust gas in order to facilitate increased engine air inlet density. In one embodiment, an EGR valve 154 diverts the exhaust gas past the EGR cooler 122 through an EGR bypass 152.

Various sensors, such as temperature sensors 124, pressure sensors 126, fuel sensor 128, exhaust gas flow sensors 165, and the like, may be strategically disposed throughout the engine system 100 and may be in communication with the controller 130 to monitor operating conditions. In one embodiment, the fuel sensor 128 senses the amount of fuel consumed by the engine, and the exhaust gas flow sensors 165 sense the rate at which exhaust gas is flowing at the particulate filter 150.

Engine operating conditions can be ascertained from any of the sensors or from the controller 130's commands to the engine regarding the fraction of exhaust gas recirculation, injection timing, and the like. In one embodiment, information is gathered regarding, for example, fueling rate, engine speed, engine load, the angle at which injection timing is advanced or retarded, time passed, fraction of exhaust gas recirculation, driving conditions, whether and when regenerations have occurred and the rate such regenerations have removed particulate matter, etc.

One way of estimating the amount of particulate matter accumulated on a diesel particulate filter such as the filter 150 to determine whether regeneration has occurred or is needed, is to use information regarding the pressure differential over the filter 150 as ascertained by a sensor or series of sensors such as pressure sensors 126, and the rate of exhaust gas flowing from the engine as ascertained by a sensor or series of sensors such as the exhaust gas flow sensor 165. That estimation method is further detailed in related patent application, "Apparatus, System, and Method for Estimating Ash Accumulation," filed 15 Sep. 2005, and application, "Apparatus, System, and Method for Providing Combined Sensor and Estimated Feedback," filed 15 Sep. 2005, each of which are incorporated herein by reference.

Generally, the rate of ash production is very small compared to the rate of soot production; therefore, as a practical matter in many instances, soot production and particulate production can be seen as being substantially equivalent, with references to "soot production" being read as "particulate production," and vice versa.

The engine 110 will produce soot and ash at a rate that will vary according to the type of engine it is; for example, whether it is an 11-liter or 15-liter diesel engine. Additionally, the rate of particulate production will vary according to engine operating conditions such as fuel rate, exhaust gas recirculation (EGR) fraction, and timing of fuel injection into the cylinders (SOI, or start of injection). Other factors may also bear on the particulate production rate. The relationship between these engine operating conditions and particulate production can be ascertained by empirical evidence gathered in the laboratory or in the field, or by theoretical calculations. The relationship of some of the operating conditions to particulate production will depend heavily on the engine platform being considered, while others will be closer to platform-independent.

Problems arise when, after the relationships have been ascertained, one or more of those factors undergo unseen change. For example, a 15-liter engine diesel engine that produces 15 grams of particulate matter per hour under certain operating conditions might produce 16 or 17 grams of particulate matter per hour under those same operating conditions as it ages. If the engine's EGR valve does not open as much as expected, the engine may not produce as much particulate matter. Other undetected changes to operating conditions, such as the operations of a VGT turbo or fuel injector, can impact particulate production rates, making rates estimated by methods disclosed in, for example, this application's parent application, increasingly inaccurate.

Other systems of estimating the status of a given mechanism or process may likewise require calibration due to unseen changes or other factors. In one embodiment, the present invention addresses methods of estimation in particular that employ interpolation, allowing for calibration whenever operating conditions permit.

Figure 2:
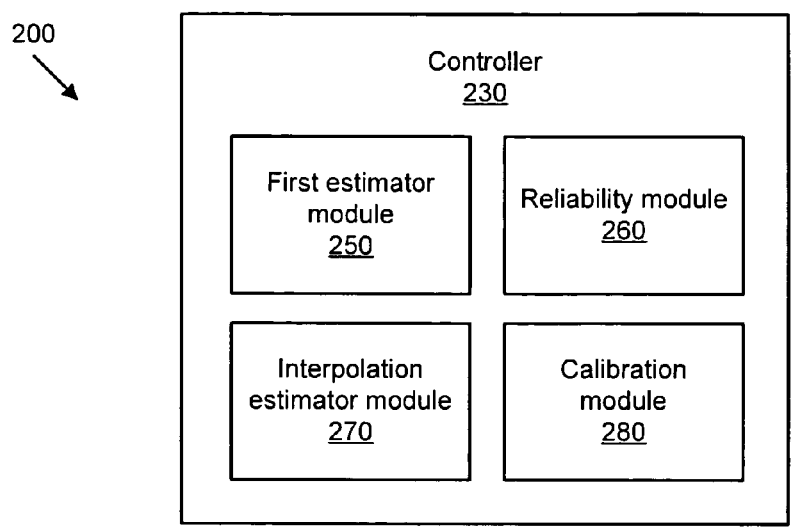
FIG. 2 is a schematic block diagram illustrating one embodiment of a control system according to the present invention.

One embodiment of an apparatus for calibrating an estimator according to the present invention is illustrated in FIG. 2. FIG. 2 shows a control system 200 comprising a controller 230, the controller 230 containing a first estimator module 250, a reliability module 260, an interpolation estimator module 270, and a calibration module 280.

As is known in the art, the controller 230 and components may comprise processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices.

The first estimator module 250 is configured to determine a first estimate of the status of a given mechanism or process. The reliability module 260 is configured to determine the reliability of the first estimate. The interpolation estimate module 270 is configured to determine a second estimate of the status of the mechanism or process through interpolation, e.g., by interpolating between a high status value and a low status value according to a status marker. The calibration module 280 is configured to calibrate the interpolation estimator module 270 according to the difference between the first and second estimates.

Figure 3:
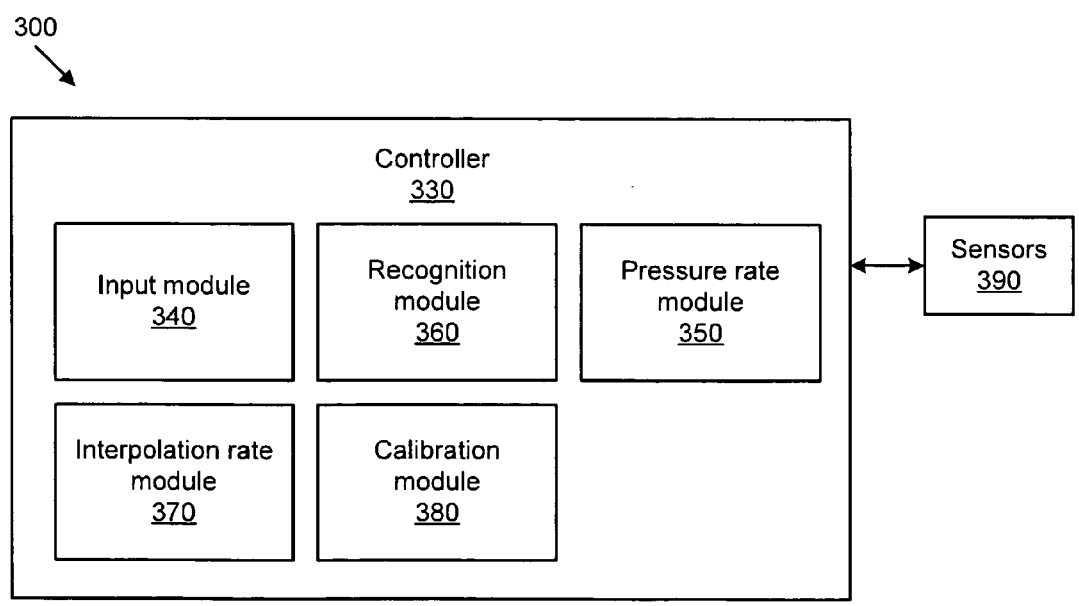
FIG. 3 is a schematic block diagram illustrating a further embodiment of a control system according to the present invention.

FIG. 3 illustrates another embodiment of a control system 300 according to the present invention, in this case a control system used for a diesel engine system, such as the system 100 shown in FIG. 1, capable of calibrating an estimate of particulate production from the engine 110. The control system 300 includes sensors 390, which may include the temperature sensors 124, pressure sensors 126, fuel sensor 128, exhaust gas sensors 165 and other sensors monitoring engine operating conditions. The control system 300 further includes a controller 330, which may be the controller 130.

The controller 330 includes an input module 340, a recognition module 360, a pressure rate module 350, an interpolation rate module 370, and a calibration module 380. The input module 340 is configured to receive engine operating condition data from the sensors 390. The pressure rate module 350 is configured to estimate the rate of particulate production from the engine 110. In one embodiment, the pressure rate module 350 estimates particulate production at least partially as a function of differential pressure across the particulate filter 150 as measured by the pressure sensors 126, as further detailed below.

The recognition module 360 is configured to recognize calibration opportunities, as further detailed below. The interpolation rate module is configured to estimate particulate production from the engine 110 by, in one embodiment, taking a pre-determined high particulate production rate and a pre-determined low particulate production rate for the engine 110 and interpolating between them according to a status or rate marker, indicating the expected level of particulate production given the engine operating conditions input by the sensors 390. The calibration module 380 is configured to calibrate the interpolation rate module 370 when the recognition module 360 recognizes a calibration opportunity.

Figure 4:
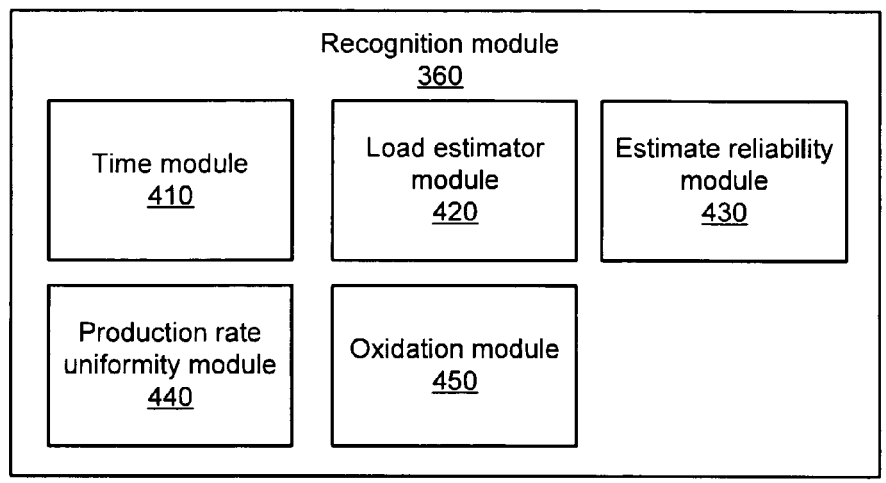
FIG. 4 is a schematic block diagram illustrating one embodiment of a recognition module used in the control system of FIG. 3.

Referring now to FIG. 4, the recognition module 360 further contains a time module 410, a load estimator module 420, an estimate reliability module 430, a production rate uniformity module 440, and an oxidation module 450.

The load estimator module 420 is configured to estimate the load of particulate matter on the filter 150, in one embodiment via measurement of the differential pressure across the filter 150 as measured by the pressure sensors 126, and store selected estimates. The estimate reliability module 430 determines whether a given estimate made by the load estimator module 420 is reliable enough to be wholly or partially used in a calibration of the interpolation rate module 370. As further detailed in related patent application, "Apparatus, System, and Method for Determining and Implementing Estimate Reliability," filed 15 Sep. 2005, the estimate reliability module 430 can determine the reliability of the differential pressure output at least partially by air flow through and uniformity of particulate distribution on the filter 150. Other factors impacting the reliability of the estimate may also be used, as will be apparent to those skilled in the art in light of this disclosure.

The oxidation module 450 is configured to determine whether oxidation is occurring on the filter 150 and, in one embodiment, how much. The production rate uniformity module 440 is configured to determine whether the particulate production rate remains uniform over time, which in one embodiment is based on uniformity of engine operating conditions such as engine load, fueling rate, engine speed, EGR fraction, injection timing, and/or other factors. The time module 410 is configured to determine whether enough time has passed for a suitable calibration opportunity based on engine load and other factors, as further described below.

Figure 5A:
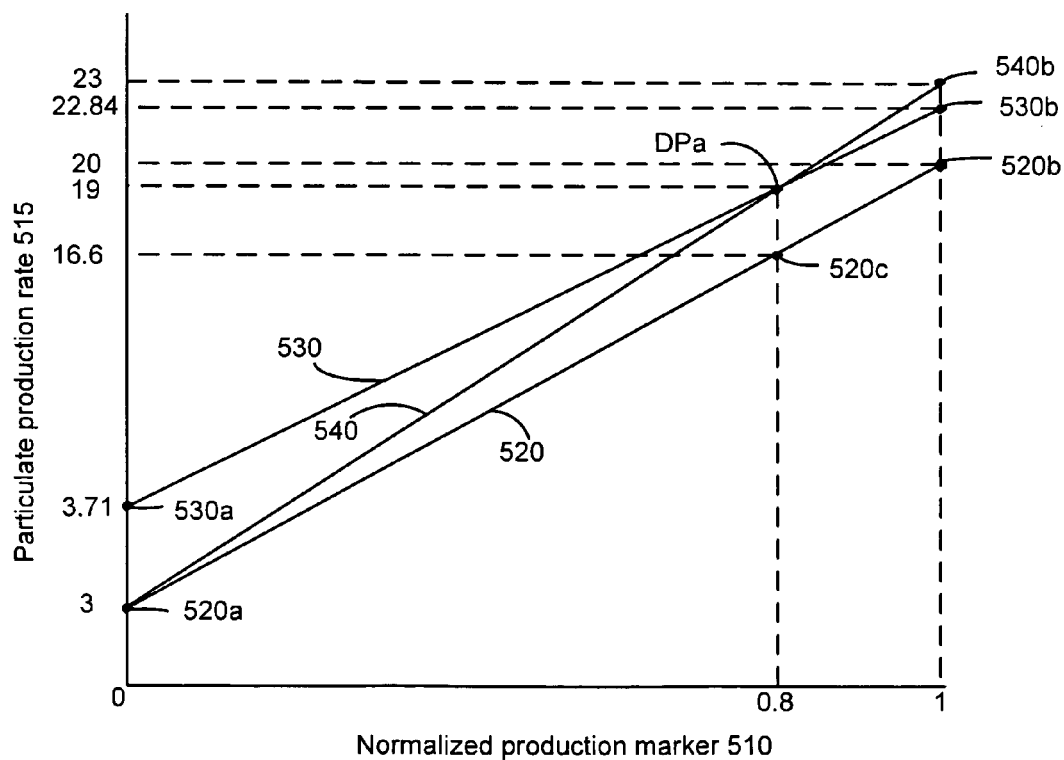
FIG. 5A is a graph illustrating examples according to the present invention of a calibrated relationship between a normalized production marker and particulate production rate when the normalized production marker is relatively high.
Figure 5B:
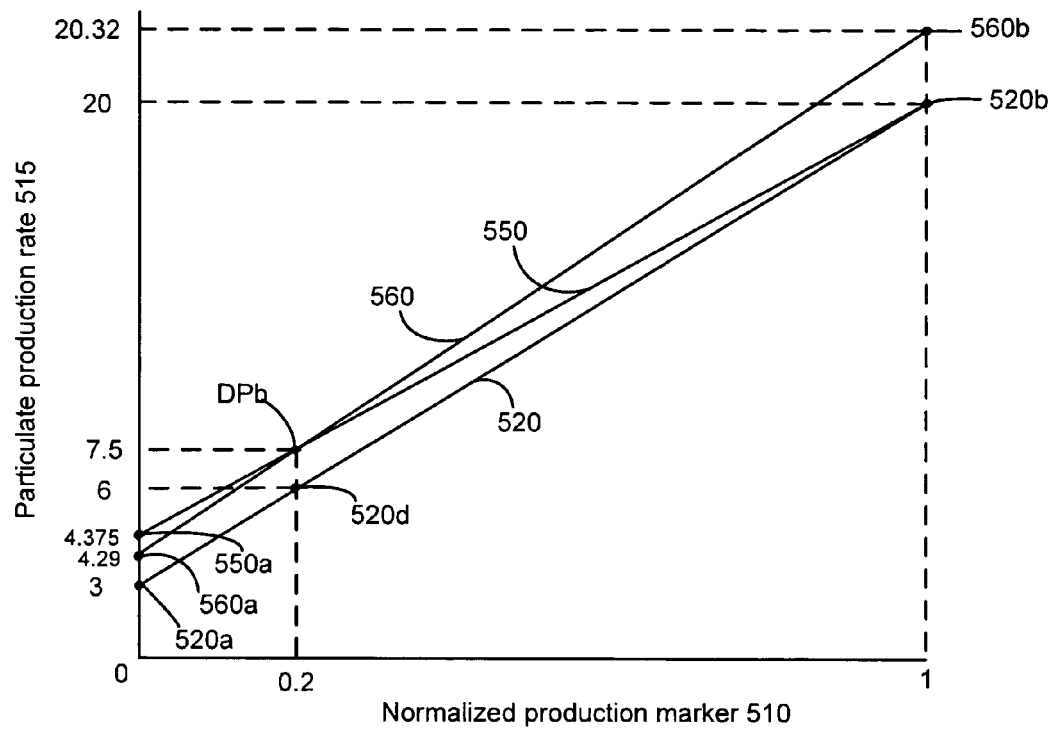
FIG. 5B is a graph illustrating examples according to the present invention of a calibrated relationship between a normalized production marker and particulate production rate when the normalized production marker is relatively low.

FIGS. 5A and 5B are graphs illustrating different embodiments of calibration according to the present invention. The scales are non-uniform for illustrative purposes.

FIG. 5A shows examples of calibration that could be carried out when a given engine has a relatively high particulate production rate, positing a situation where, for example, a truck containing the engine system 100 is going down the highway under a high load at a high rate of speed. A normalized production marker 510 indicates that the engine 110 is producing particulate matter at 80 percent on a range between a high rate and a low rate of a particulate production rate 515, i.e., 0.8 on a normalized scale of 0 to 1, 0 corresponding to a low production rate and 1 to a high production rate.

In one embodiment, the low production rate used in the calculation may be the engine 110's minimum particulate production rate, such as when the engine 110 is idling and other particulate production factors are at a minimum, while the high production rate may be the maximum particulate production rate, such as when the engine 110 is at its maximum speed and load with other particulate production factors at a maximum.

In FIG. 5A, the low particulate production rate (with the normalized production marker 510 at 0) is 3 grams per hour, as shown in point 520a. The high particulate production rate (with the normalized production marker 510 at 1) is 20 grams per hour, as shown in point 520b. Interpolating linearly between the low and high rates at a normalized production marker 510 of 0.8 along the line 520 yields an estimated particulate production rate of 16.6 grams per hour, shown at point 520c. In equation form, the interpolated value can be calculated as M*HR+LR=IV, where M is the normalized production marker 510, HR is the high rate, LR is the low rate, and IV is the interpolated value, in this case the production rate 520c.

At or near the same time, using different methods including, in one embodiment, differential pressure across the filter 150, the load of accumulated particulate on the filter 150 is estimated. If that estimate is determined to be reliable based on exhaust flow through the filter, uniform distribution, and/or other factors, then a potential calibration opportunity has presented itself. In order for that potential calibration opportunity to come to fruition, enough time must pass with the engine at uniform operating conditions, i.e., producing particulate at a uniform rate, with no significant oxidation occurring (with other factors influencing the decision to calibrate as needed or desired), to determine a differential pressure-based rate of particulate production that is relatively reliable. That rate is calculated by taking the difference between the particulate load on the filter 150 at the end of the time period and the beginning of the time period and dividing it by the elapsed time.

As an example, it may be determined that if the engine 110 is at uniform operating conditions with no significant oxidation at a normalized particulate production rate of 0.8, i.e., under a high speed and heavy load, for 20 minutes, that may be considered a sufficient time period to trust that the particulate production rate resulting from differential pressure particulate load estimates is or approaches the actual particulate production rate. If that estimated rate turns out to be 19 grams per hour, as shown at point DPa in FIG. 5A, then the interpolated estimate of 16.6 grams per hour is inaccurate.

In one embodiment, the method or apparatus carrying out the interpolated production rate estimations can now be calibrated to better reflect actual production rates by adjusting the high production rate 520b, the low production rate 520a, or both.

In the case of FIG. 5A, with the normalized production marker 510 at 0.8, i.e., close to the high rate, the user may choose to calibrate only the high rate. That is done in one embodiment by solving the equation $H_1 = H + \eta$, where $$\eta = \frac{R - L - \alpha * H + \alpha * L}{\alpha},$$

$R = L + (H_1 - L) * \alpha$, $H_1$ is the new high rate 540b, H is the high rate 520b, L is the low rate 520a, $\alpha$ is the rate marker 510, and R is the estimate DPa. In this embodiment, solving the equation yields a new high rate 540b of 23 grams per hour, a difference of 3 grams per hour, with the low rate 520a remaining the same. Future interpolation estimates then take place along the line 540, rather than the line 520, the line 540 having the same low rate 520a as the line 520, but a new high rate 540b.

It may be that the estimated rate DPa based on differential pressure is not completely reliable, but still reliable enough to better reflect actual production rates than the interpolated estimate 520c. In that case, or in other cases where calibrating 100 percent toward the estimated rate DPa may not be desirable, the line 520 may be calibrated only partially toward the estimated rate DPa. In that case, $H_1 = H + \eta * P$, where P is the percentage of calibration desired. In our above example, if it were desired to calibrate the high rate by 25 percent, the new high rate would be 20.75, with the line 520 correspondingly shifted.

Rather than just calibrating the high rate, in one embodiment both the low and high rates may be calibrated. That is accomplished in one embodiment by solving the equations $L_1 = L + \eta$ and $$H_1 = H + \eta * \frac{\alpha}{1 - \alpha},$$

where $$\eta = \frac{R - L - \alpha * H + \alpha * L}{1 + \frac{\alpha^2}{1 - \alpha} - \alpha},$$

$R = L_1 + (H_1 - L_1) * \alpha$, $L_1$ is the new low rate 530a, L is the low rate 520a, $H_1$ is the new high rate 530b, H is the high rate 520b, $\alpha$ is the rate marker 510, and R is the estimate DPa. In our example, solving the equations yields a new high rate 530b of 22.84 grams per hour, and a new low rate 530a of 3.71 grams per hour. Future interpolation estimates then take place along the line 530.

If it is desired because of only partial reliability of the estimated rate DPa or other reasons to calibrate the line 520 only partially toward the estimated rate DPa, $L_1 = L + \eta * P$ and $$H_1 = H + \eta * \frac{\alpha}{1 - \alpha} * P,$$

where P is the percentage of calibration desired.

In the example of the preceding paragraph, if it were desired to calibrate the high and low rates by 25 percent, the new high rate would be 20.71 grams per hour and the new low rate would be 3.18 grams per hour, with the line 520 correspondingly shifted.

FIG. 5B shows examples of calibration that could be carried out when a given engine has a relatively low particulate production rate, positing a situation where, for example, a truck containing the engine system 100 is idling. The normalized production marker 510 indicates that the engine 110 is producing particulate matter at 20 percent on a range between a high rate and a low rate of the particulate production rate 515, i.e., 0.2 on a normalized scale of 0 to 1.

As in FIG. 5A, in FIG. 5B the low particulate production rate (with the normalized production marker 510 at 0) is 3 grams per hour, as shown in point 520a. The high particulate production rate (with the normalized production marker 510 at 1) is 20 grams per hour, as shown in point 520b. Interpolating linearly between the low and high rates at a normalized production marker 510 of 0.2 along the line 520 yields an estimated particulate production rate of 6 grams per hour, as shown at point 520d. Similar to FIG. 5A, in equation form, the interpolated value can be calculated as M*HR+LR=IV, where M is the normalized production marker 510, HR is the high rate, LR is the low rate, and IV is the interpolated value, in this case the production rate 520d.

Similarly to what was described above with relation to FIG. 5A, the load of the accumulated particulate on the filter 150 is estimated. In this case, however, if differential pressure across the filter 150 is used to estimate the load, the estimate in one embodiment must be made immediately before the period of engine idling, since differential pressure estimates are generally unreliable at low engine speeds.

If the differential-pressure estimate is wholly or partially reliable, a potential calibration opportunity has arisen. In order for that potential calibration opportunity to come to fruition, enough time must pass with the engine at uniform operating conditions, i.e., producing particulate at a uniform rate, with no significant oxidation occurring (with other factors influencing the decision to calibrate as needed or desired), to determine a differential pressure-based rate of particulate production that is relatively reliable.

For example, it may be determined that if the engine 110 is at uniform operating conditions with no significant oxidation at a normalized particulate production rate of 0.2, e.g., idling, for 6 hours, that is a sufficient time period to trust that the particulate production rate resulting from differential pressure particulate load estimates is or approaches the actual particulate production rate. If that estimated rate turns out to be 7.5 grams per hour, as shown at point DPb in FIG. 5B, then the interpolated estimate of 6 grams per hour is inaccurate.

With the normalized production marker 510 at 0.2, i.e., close to the low rate, the user may choose to calibrate only the low rate. That is done in one embodiment by solving the equation $L_1=L+\eta$, where $$\eta = \frac{R + L*\alpha - \alpha*H - L}{1 - \alpha},$$

$R=L_1+(H-L_1)*\alpha$, $L_1$ is the new low rate 550a, L is the low rate 520a, H is the high rate 520b, $\alpha$ is the rate marker 510, and R is the estimate DPb. In this embodiment, solving the equation yields a new low rate 550a of 4.375 grams per hour, a difference of 1.375 grams per hour, with the high rate 520b remaining the same. Future interpolation estimates then take place along the line 550, rather than the line 520, the line 550 having the same high rate 520b as the line 520, but a new low rate 550a.

If calibrating 100 percent toward the estimated rate DPb is not desired, the line 520 may be calibrated only partially toward the estimated rate DPb. In that case, $L_1=L+\eta*P$, where P is the percentage of calibration desired. If the desired calibration were 25 percent toward the estimate DPb, the new low rate would be 3.34 grams per hour, with the line 520 correspondingly shifted.

Similarly to FIG. 5A, which shows a high production marker, with a low production marker 510 shown in FIG. 5B both the low and high rates may be calibrated. This is accomplished in one embodiment by solving the same equations, i.e., $L_1=L+\eta$ and $$H_1 = H + \eta * \frac{\alpha}{1-\alpha}, \text{ where } \eta = \frac{R - L - \alpha*H + \alpha*L}{1 + \frac{\alpha^2}{1-\alpha} - \alpha},$$

$$R = L_1 + (H_1 - L_1)*\alpha$$

$L_1$ is the new low rate 560a, L is the low rate 520a, $H_1$ is the new high rate 560b, H is the high rate 520b, $\alpha$ is the rate marker 510, and R is the estimate DPb. In our example, solving the equations yields a new high rate 560b of 20.32 grams per hour and a new low rate 560a of 4.29 grams per hour. Future interpolation estimates then take place along the line 560.

If it is desired to calibrate the line 520 only partially toward the estimated rate DPb, $L_1=L+\eta*P$ and $$H_1 = H + \eta * \frac{\alpha}{1-\alpha} * P,$$

where P is the percentage of calibration desired. In the example of the preceding paragraph, if it were desired to calibrate the high and low rates by 25 percent, the new high rate would be 20.08 grams per hour and the new low rate would be 3.32 grams per hour, with the line 520 correspondingly shifted.

Figure 6:
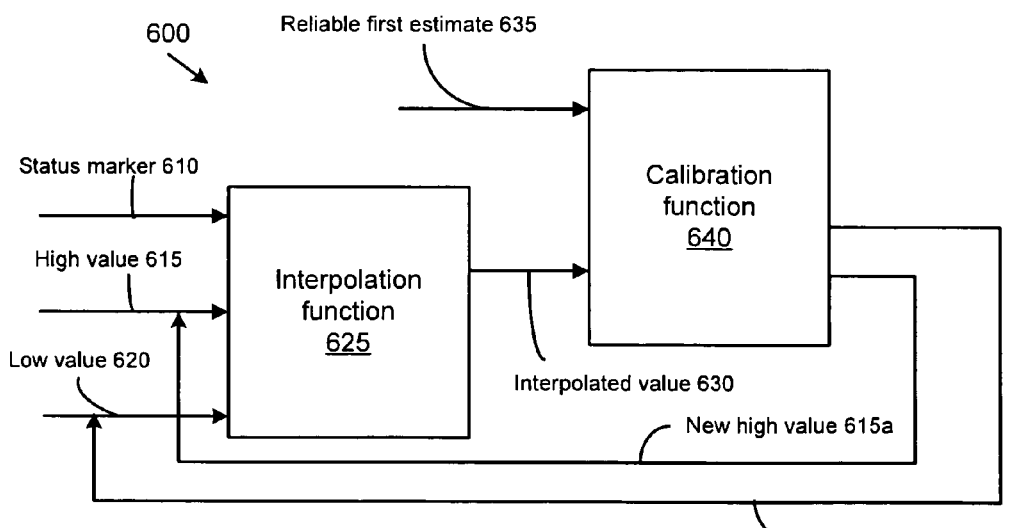
FIG. 6 is a chart illustrating one embodiment of a method of calibrating a particulate production rate according to the present invention.

FIG. 6 illustrates a method 600 for calibrating an estimator according to the present invention, the estimator being configured to estimate, by interpolation, the status of a given mechanism or process. The method 600 may be carried out, e.g., by the control system 200 depicted in FIG. 2.

As shown, the interpolation estimator module 270 uses a status marker 610, a high status value 615, and a low status value 620 as inputs into an interpolation function 625 to come up with an interpolated status value 630. The calibration module 280 takes a first estimate 635, whose value is determined by the first estimator module 250 and which is determined as reliable by the reliability module 260, and the second estimate or interpolated status value 630, as inputs for a calibration function 640. Based on its inputs, the calibration function 640 determines a new high status value 615a and a new low status value 620a, which are substituted for the high value 615 and low value 620, respectively, giving the interpolation function 625 more accurate inputs.

The schematic flow chart diagrams that follow, as well as the preceding method schematic diagram, are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
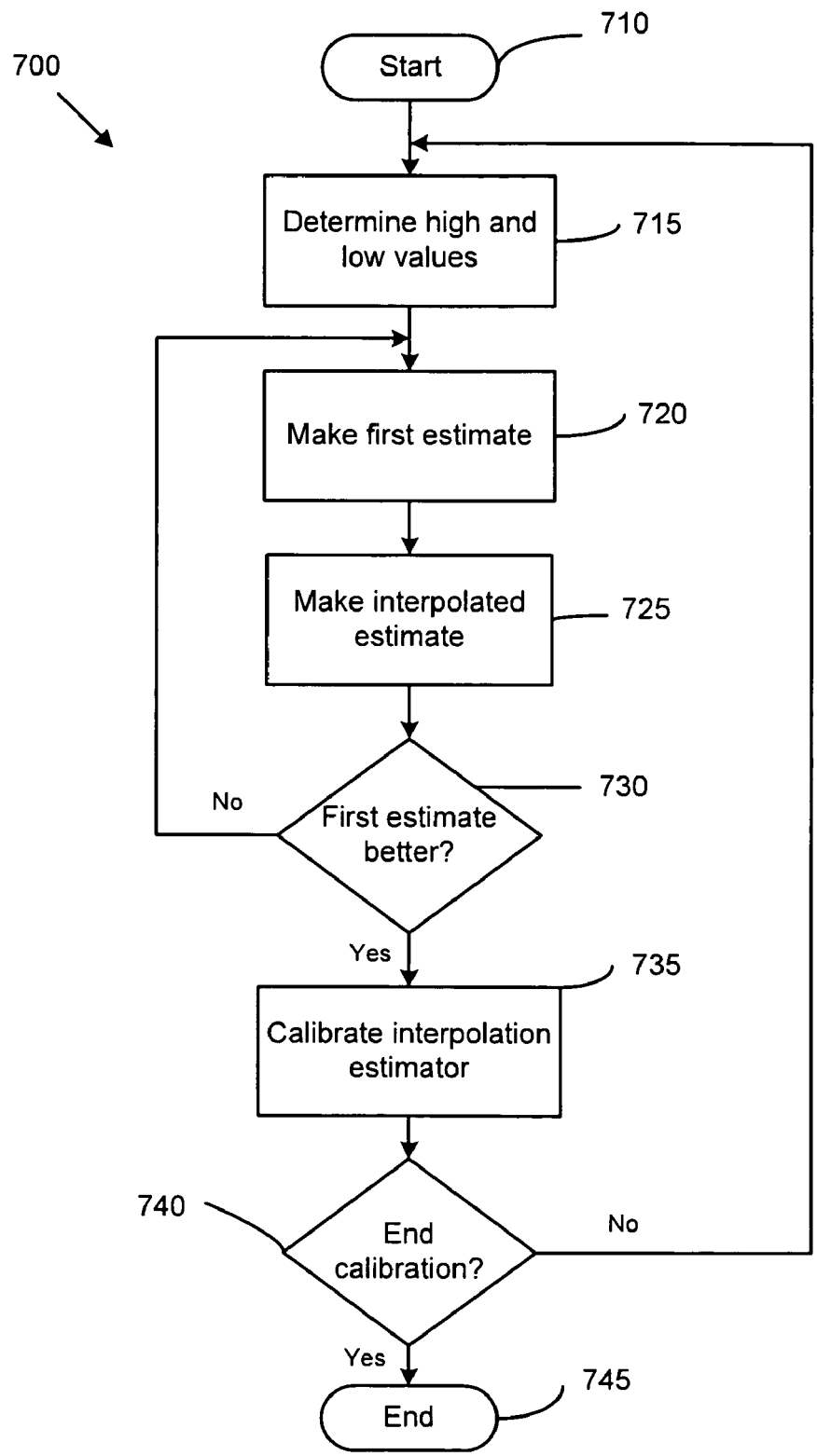
FIG. 7 is a schematic flow chart diagram illustrating an embodiment of a method of calibrating an interpolation estimator according to the present invention.

FIG. 7 illustrates a method 700 for calibrating an interpolation estimator such as the interpolation estimation module 270 shown in FIG. 2, the interpolation estimator 270 being configured to estimate the status of a mechanism or process. As shown, the method begins 710, and a high status value and low status value are determined 715. A first estimate is determined 720 by, e.g., the first estimator module 250. The interpolation estimator module 270 then makes 725 a status estimate, using the high and low values determined in step 715 and interpolating between them, linearly or according to an alternative desired function. The reliability module 260 then determines 730 whether the first estimate is as reliable or more reliable than the interpolated estimate. (There may also be embodiments where the user may desire to use a relatively unreliable first estimate to calibrate an interpolation estimator.) If the first estimate is not as reliable or more reliable than the interpolated estimate, the method returns to step 720 and determines a new first estimate. If the first estimate 720 is at least relatively reliable, the calibration module 280 calibrates the interpolation estimator module 270. The controller 230 then determines 740 whether to end the calibration cycle. If no, the method 700 begins anew. If yes, the method ends 745.

Figure 8A:
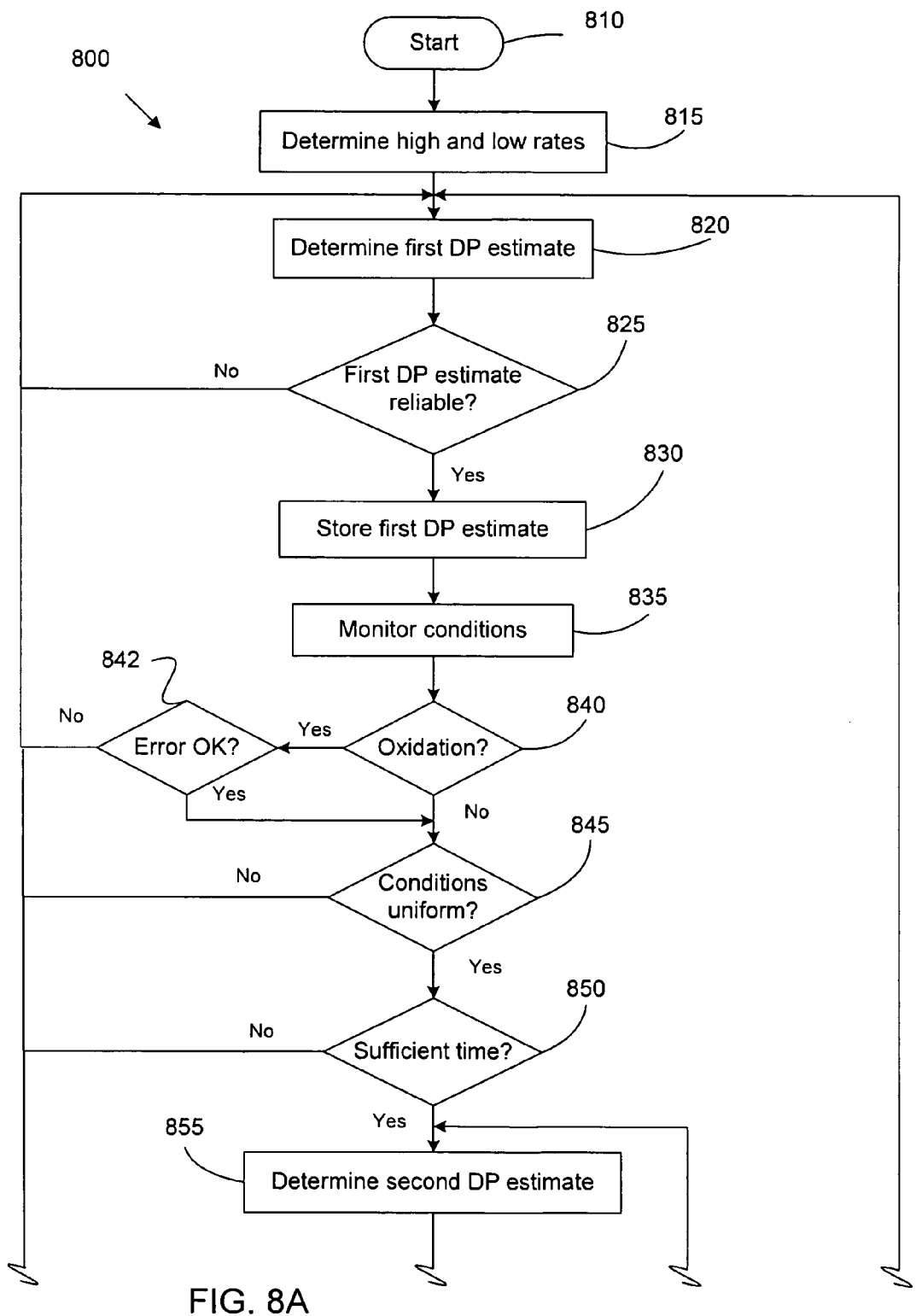
FIG. 8 (divided into FIGS. 8A and 8B) is a schematic flow chart diagram illustrating an embodiment of a method of calibrating a diesel engine particulate production rate according to the present invention.
Figure 8B:
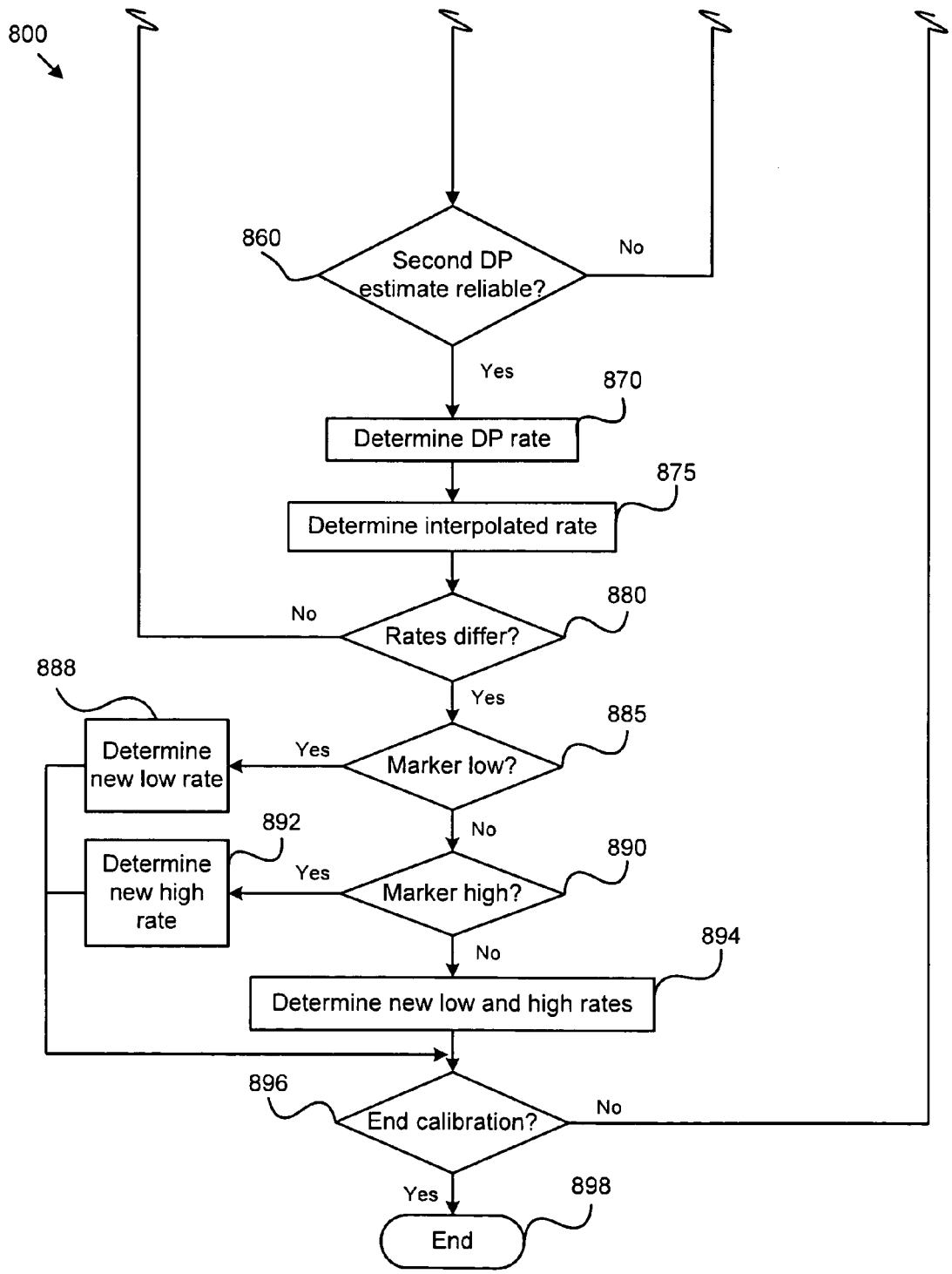

FIGS. 8A and 8B collectively illustrate a method 800 of calibrating a diesel engine particulate production rate estimator, such as the interpolation rate module 370 shown in FIG. 3. The method 800 will be described as used, in one embodiment, by the control system 300.

The method begins 810, and the engine 110's high and low particulate production rates are determined 815, or, alternatively, the engine's stored predetermined high and low particulate production rates are retrieved. The load estimator module 420 then makes a first estimate of the accumulated particulate load on the filter 150 using differential pressure across the filter as measured by the sensors 126. The estimate reliability module 430 determines 825 whether the first particulate load estimate is reliable, using exhaust flow rate as measured by the sensors 165, uniformity of particulate distribution on the filter 150, and/or other factors. Estimates of varying reliability or accuracy may be used in the method 800, depending on the preferences of the user. If the estimate is unreliable, the load estimator module 420 continues to determine differential pressure estimates 820 until the estimate reliability module 430 determines one to be reliable. Once that happens, a potential calibration opportunity presents itself, and the load estimator module 420 stores the first estimate 830.

With the first estimate stored, the production rate uniformity module 440 monitors engine operating conditions 835 based on input from the sensors 390 and/or other means. The oxidation module 450 determines 840 whether significant oxidation is occurring on the filter 150, and, in one embodiment, how much.

In one embodiment, the oxidation module 450 makes its determination of oxidation rate (and associated error margin) based on the temperature of the filter 150; oxidation from oxygen molecules ($O_2$) generally occurs on the filter at temperatures above about 400 degrees centigrade, while oxidation from nitric oxides ($NO_2$) generally occurs at temperatures between about 250 C and 400 C. In a further embodiment, the oxidation module 450 makes its determination of the oxidation rate and associated error margin based on the temperature of the filter 150, particulate loading on the filter 150, and component concentration of $O_2$ and/or $NO_2$, as detailed in related application, "Apparatus, System, and Method for Estimating Particulate Consumption," incorporated herein by reference.

In one embodiment, oxidation is ignored in the analysis. If the oxidation module 450 determines that significant oxidation is occurring, the calibration opportunity is lost, and the method 800 returns directly to the point where the load estimator module 420 determines 820 the first differential-pressure estimate. If the oxidation module 450 determines that no significant oxidation is occurring (such as when the temperature of the filter 150 falls below about 250 C), the method continues.

The amount of oxidation determined to be "significant" is a design choice determined by the user. For example, in this embodiment, if the user determines that more than 10 percent oxidation of particulate accumulated on the filter 150 between the first estimate (step 820) and the second estimate (step 855) is unacceptable, then an oxidation rate of 11 percent would be significant and the calibration opportunity would be lost.

A further embodiment widens the ranges of temperatures and operating conditions in which the calibration can be made by incorporating oxidation into the algorithm. In this embodiment, the oxidation module 450 determines 840 whether oxidation is occurring on the filter 150. If so, the oxidation module 450 determines the oxidation rate and associated error as detailed above and determines 842 whether the error caused by incorporating oxidation into the analysis is acceptable.

As an example of this embodiment, assume that the total particulate accumulation as calculated by subtracting the first estimate from the second estimate is 30 grams. Assume further that the estimated oxidation rate would have caused 10 grams of particulate to be oxidized during that time, meaning 40 grams of particulate were produced. If the oxidation rate's error margin is 30 percent (a fairly typical error), that translates to plus or minus 3 grams of oxidation error, or 7.5 percent total accumulation error due to oxidation (grams oxidation error/grams produced, in this case 3 g/40 g).

The user determines acceptable error similarly to the embodiment in which oxidation is ignored. In this example, if the user determines 10 percent to be an acceptable accumulation error due to oxidation, the calibration module 450 determines 842 the 7.5 percent error to be acceptable, and the method continues to step 845. If the error exceeds the acceptable error, the calibration opportunity is lost and the method returns to determine 820 a new first estimate.

If oxidation is not significant, or, alternatively, if the accumulation error caused by incorporating oxidation into the analysis is acceptable, the production rate uniformity module 440 determines 845 whether the operating conditions are uniform such that the engine 110's production rate of particulate matter remains constant. If the rate changes significantly before sufficient time to make the differential-pressure rate estimate reliable has passed 850, the calibration opportunity is lost, and the method 800 returns to the point where the load estimator module 420 determines 820 the first differential-pressure estimate. If, however, the time module 410 determines 850 that sufficient time has passed, the method 800 continues.

What constitutes sufficient time for a differential pressure-based estimate of particulate production rate to be reliable depends on the equipment and circumstances. In the case described in connection with FIG. 5A, with the production marker 510 indicating a high particulate output, 20 minutes may be sufficient. In the case of FIG. 5B, with the production marker 510 indicating a low particulate output, 6 hours may be more appropriate.

When the time module 410 determines that sufficient time has passed for a reliable particulate production rate based on differential pressure measurements, the load estimator module 420 determines 855 a second particulate filter load estimate, and the estimate reliability module 430 determines 860 whether the second estimate is reliable. If it isn't, the load estimator module 420 determines 855 another second estimate.

If the load estimator module 420 is unable to determine a reliable second estimate within a short time period after the particulate production rate changes, the method 800 begins again, as changing production rates quickly make the differential pressure-based rate estimate unreliable. In cases when the production marker 510 is low during the time period of particulate production uniformity, the first and second estimates in one embodiment must be made immediately before and after the time period, when the production marker 510 is high, in order to obtain reliable load estimates.

If the estimate reliability module 430 determines the second estimate to be reliable, the pressure rate module 350 estimates 870 the engine 10's particulate production rate based on differential pressure measurements. In the embodiment described above in which oxidation is ignored, this is done by determining particulate accumulation (subtracting the first particulate load estimate from the second particulate load estimate) and dividing by the time passed. In the embodiment described above in which oxidation is taken into account, the estimated amount of oxidized particulate is added to the particulate accumulation before dividing by the time passed. For example, if the observed particulate accumulation is 5 grams over 30 minutes, and the estimated amount of oxidized particulate is 3 grams within the 30 minutes, then the engine 110's particulate production for the 30 minute period is estimated as 8 grams.

The particulate production rate so determined constitutes a first rate estimate. The interpolation rate module 370 then determines 875 an interpolated particulate production rate as described above, which constitutes a second rate estimate. If the first and second rates, as estimated, are the same 880, there is no need for calibration and the method returns to step 820. If the rates differ 880, the calibration module 380 in one embodiment determines 885 whether the normalized production marker 510 was low and, if so, determines 888 a new low production rate as described above. If the production marker 510 was high 890, the calibration module 380 determines 892 a new high production rate. If the marker was neither low nor high, the calibration module 380 determines 894 new high and low rates.

Whether and when the calibration module 380 determines a new low rate, high rate, or both, as a part of its calibration is a design choice on the part of the user depending on preference and circumstance. The production rate to be considered when making the choice is the rate occurring during the time period between the making of the first and second differential pressure-based estimates.

After the calibration module 380 has calibrated the interpolation module 370, the method repeats 896 or, if the controller 330 determines 896 to end the method (such as when the engine is turned off), the method ends 898.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for calibrating estimated particulate production from a diesel engine, the apparatus comprising:
    a first estimator, the first estimator configured to determine a first estimate of the engine's actual particulate production rate;
    a second estimator, the second estimator configured to determine a second estimate of the engine's actual particulate production rate by interpolating between a high particulate production rate and a low particulate production rate according to a rate marker;
    a calibrator, the calibrator configured to calibrate the second estimator according to the difference between the first and second estimates.

2. The apparatus of claim 1, further comprising a reliability determiner, the reliability determiner configured to determine the reliability of the first estimate, and wherein the calibrator is configured to calibrate the second estimator according to the reliability of the first estimate.

3. The apparatus of claim 1, wherein the calibrator is configured to calibrate the second estimator by calculating a new low particulate production rate as a function of the rate marker, and by calculating a new high particulate production rate as a function of the rate marker.

4. The apparatus of claim 1, further comprising a diesel particulate filter operatively connected to the engine, and wherein the first estimator is configured to estimate the actual particulate production rate as a function of differential pressure across the filter over time.

5. The apparatus of claim 4, further comprising a recognition module, the recognition module configured to recognize opportunities for calibration based on the reliability of the first estimate and the uniformity of particulate accumulation on the filter.

6. A method of calibrating an estimator, the estimator configured to estimate the status of a mechanism or process, the method comprising:
    determining a first estimate of the status of the mechanism or process;
    using the estimator to determine a second estimate of the status of the mechanism or process by interpolating between a high status value and a low status value according to a status marker;
    calibrating the estimator according to the difference between the first estimate and the second estimate.

7. The method of claim 6, further comprising determining the reliability of the first estimate, and wherein calibrating the estimator comprises calibrating the estimator as a function of the reliability of the first estimate.

8. The method of claim 6, further comprising determining the reliability of the first estimate, and wherein calibrating the estimator comprises calibrating the estimator only if the first estimate is determined to be reliable.

9. The method of claim 6, wherein calibrating the estimator comprises calibrating the estimator to a degree proportionate to the difference between the first estimate and the second estimate.

10. The method of claim 6, wherein calibrating the estimator comprises calculating a new high status value when the status marker is higher than a predetermined value.

11. The method of claim 6, wherein calibrating the estimator comprises calculating a new low status value when the status marker is lower than a predetermined value.

12. The method of claim 6, wherein calibrating the estimator comprises calculating a new low status value as a function of the status marker and calculating a new high status value as a function of the status marker.

13. The method of claim 6, wherein the estimator is configured to estimate a particulate production rate from a diesel engine operatively connected to a diesel particulate filter, and wherein determining the first estimate comprises estimating the particulate production rate as a function of differential pressure across the filter over time, and wherein using the estimator to determine the second estimate comprises interpolating between a high particulate production rate and a low particulate production rate according to a rate marker.

14. The method of claim 13, wherein determining the first estimate comprises determining a first differential pressure at a point in time before a period of engine operation in which the rate of particulate accumulation on the filter remains approximately unchanged, and determining a second differential pressure at a point in time after the period of engine operation.

15. The method of claim 14, wherein the engine's operating conditions are approximately uniform during the period of engine operation.

16. The method of claim 14, wherein no significant oxidation of particulate on the filter occurs during the period of engine operation.

17. The method of claim 14, wherein estimated oxidation of particulate on the filter occurring during the period of engine operation falls within an acceptable error range.

18. The method of claim 13, wherein the rate marker comprises a normalized particulate production marker, and wherein calibrating the estimator comprises calculating a new high particulate production rate according to the equation $H_1 = H + \eta$, where $$\eta = \frac{R - L - \alpha * H + \alpha * L}{\alpha}, \; R = L + (H_1 - L) * \alpha,$$

$H_1$ is the new high rate, H is the high rate, L is the low rate, $\alpha$ is the rate marker, and R is the first estimate.

19. The method of claim 13, wherein the rate marker comprises a normalized particulate production marker, and wherein calibrating the estimator comprises calculating a new low particulate production rate according to the equation $L_1 = L + \eta$, where $$\eta = \frac{R + L * \alpha - \alpha * H - L}{1 - \alpha},$$

$R = L_1 + (H - L_1) * \alpha$, $L_1$ is the new low rate, L is the low rate, H is the high rate, $\alpha$ is the rate marker, and R is the first estimate.

20. The method of claim 13, wherein the rate marker comprises a normalized particulate production marker, and wherein calibrating the estimator comprises calculating a new low particulate production rate and a new high particulate production rate according to the equations $L_1 = L + \eta$ and $$H_1 = H + \eta * \frac{\alpha}{1 - \alpha},$$

where $$\eta = \frac{R - L - \alpha * H + \alpha * L}{1 + \frac{\alpha^2}{1 - \alpha} - \alpha},$$

$R = L_1 + (H_1 - L_1) * \alpha$, $L_1$ is the new low rate, L is the low rate, $H_1$ is the new high rate, H is the high rate, $\alpha$ is the rate marker, and R is the first estimate.

21. A signal bearing medium tangibly embodying a program of machine-readable instructions executable by a digital processing apparatus to perform operations to calibrate an estimator, the operations comprising:

determining a first estimate of the status of the mechanism or process;

using the estimator to determine a second estimate of the status of the mechanism or process by interpolating between a high status value and a low status value according to an status marker;

calibrating the estimator according to the difference between the first estimate and the second estimate.

22. The signal bearing medium of claim 21, wherein the operation of calibrating the estimator comprises calculating a new low status value as a function of the status marker and calculating a new high status value as a function of the status marker.

23. The signal bearing medium of claim 21, wherein the operation of calibrating the estimator comprises calibrating the estimator to a degree proportionate to the difference between the first estimate and the second estimate.

24. A diesel engine system, the system comprising:

a diesel engine;

an exhaust system operatively connected to the engine, the exhaust system comprising a diesel particulate filter; and a controller, the controller comprising a first estimation module, the first estimation module configured to determine a first estimate of the engine's actual particulate production rate;

a second estimation module, the second estimation module configured to determine a second estimate of the engine's actual particulate production rate by interpolating between a high particulate production rate and a low particulate production rate according to a rate marker;

a comparison module, the comparison module configured to make a comparison between the first and second estimates; and a calibration module, the calibration module configured to calibrate the second estimation module according to the comparison.

25. The system of claim 24, wherein the first estimation module is configured to determine the first estimate as a function of differential pressure across the filter over time.

26. The system of claim 24, wherein the calibration module is configured to calibrate the second estimation module by calculating a new low particulate production rate as a function of the rate marker, and by calculating a new high particulate production rate as a function of the rate marker.

27. The system of claim 24, wherein the comparison module is configured to determine the difference between the first estimate and the second estimate, and wherein the calibration module is configured to calibrate the second estimation module to a degree proportionate to the difference between the first estimate and the second estimate.

* * * * *